United States Patent
Crowell

(10) Patent No.: US 8,133,396 B2
(45) Date of Patent: Mar. 13, 2012

(54) DISSOLVED AIR FLOATATION WITH FILTER SYSTEM

(75) Inventor: Robert G. Crowell, Overland Park, KS (US)

(73) Assignee: Smith & Loveless, Inc., Lenexa, KS (US)

( * ) Notice: Subject to any disclaimer, the term of this patent is extended or adjusted under 35 U.S.C. 154(b) by 1335 days.

(21) Appl. No.: 11/652,992

(22) Filed: Jan. 11, 2007

(65) Prior Publication Data

US 2008/0169244 A1    Jul. 17, 2008

(51) Int. Cl.
*C02F 1/24* (2006.01)
*C02F 9/02* (2006.01)
*C02F 9/08* (2006.01)
*B01D 36/00* (2006.01)

(52) U.S. Cl. ........ 210/703; 210/806; 210/807; 210/202; 210/221.2; 210/266

(58) Field of Classification Search .................. 210/638, 210/703, 202, 221.2, 806, 807
See application file for complete search history.

(56) References Cited

U.S. PATENT DOCUMENTS

| | | | | |
|---|---|---|---|---|
| 2,330,589 A | * | 9/1943 | Juell | 210/703 |
| 2,697,384 A | * | 12/1954 | Craig et al. | 210/800 |
| 2,765,919 A | * | 10/1956 | Juell | 210/703 |
| 3,977,970 A | * | 8/1976 | Willis et al. | 210/703 |
| 4,874,534 A | * | 10/1989 | Sorensen et al. | 210/803 |
| 5,516,434 A | * | 5/1996 | Cairo et al. | 210/703 |
| 5,656,173 A | | 8/1997 | Jordan et al. | |
| 6,337,023 B1 | | 1/2002 | Broussard, Sr. et al. | |
| 2008/0169244 A1 | * | 7/2008 | Crowell | 210/703 |

FOREIGN PATENT DOCUMENTS

| | | |
|---|---|---|
| DE | 3412217 A1 * | 10/1985 |
| DE | 43 35 104 A1 | 6/1994 |
| SU | 1430353 A1 * | 10/1988 |

* cited by examiner

*Primary Examiner* — Thomas M Lithgow
(74) *Attorney, Agent, or Firm* — Wood, Phillips, Katz, Clark & Mortimer

(57) ABSTRACT

A system for filtering organic molecules from an electrolyte solution, including a feed inlet line adapted to carry a solution with organic molecules, a filter vessel secured to the inlet line, and a pump adapted to introduce dissolved air into the solution in the feed inlet line. The filter vessel is a solvent extraction filter having coalescing media above a solution outlet at the bottom of the vessel and an organic vent outlet at the top of the vessel. The system operates by (a) dissolving air into the solution, (b) inputting the solution with dissolved air into the filter vessel, (c) outletting solution from the bottom vessel outlet to flow solution down through coalescing media, and (d) periodically venting floating organic molecules from the top of the vessel.

7 Claims, 2 Drawing Sheets

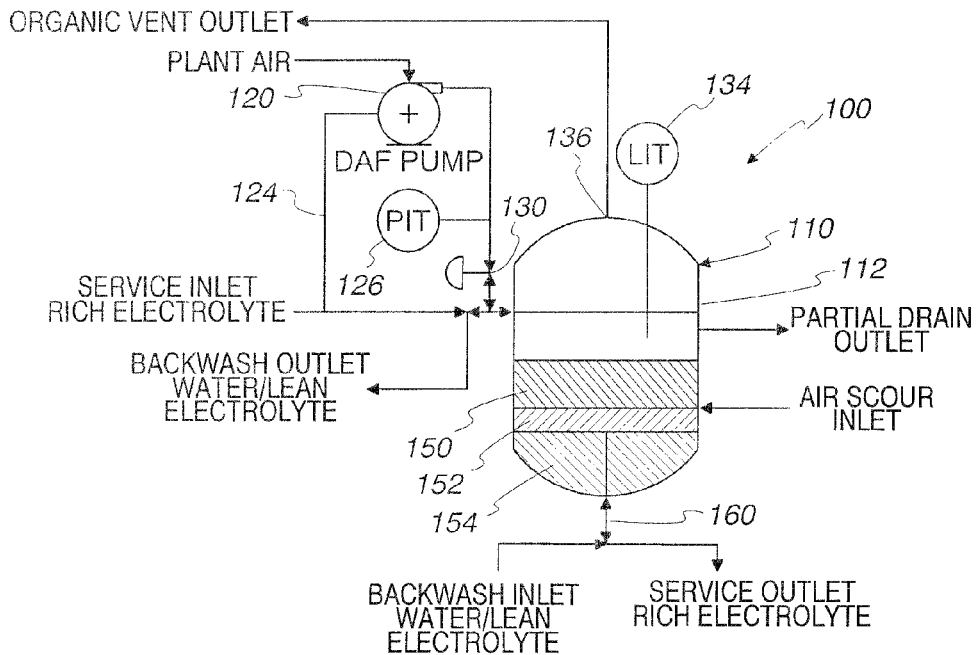
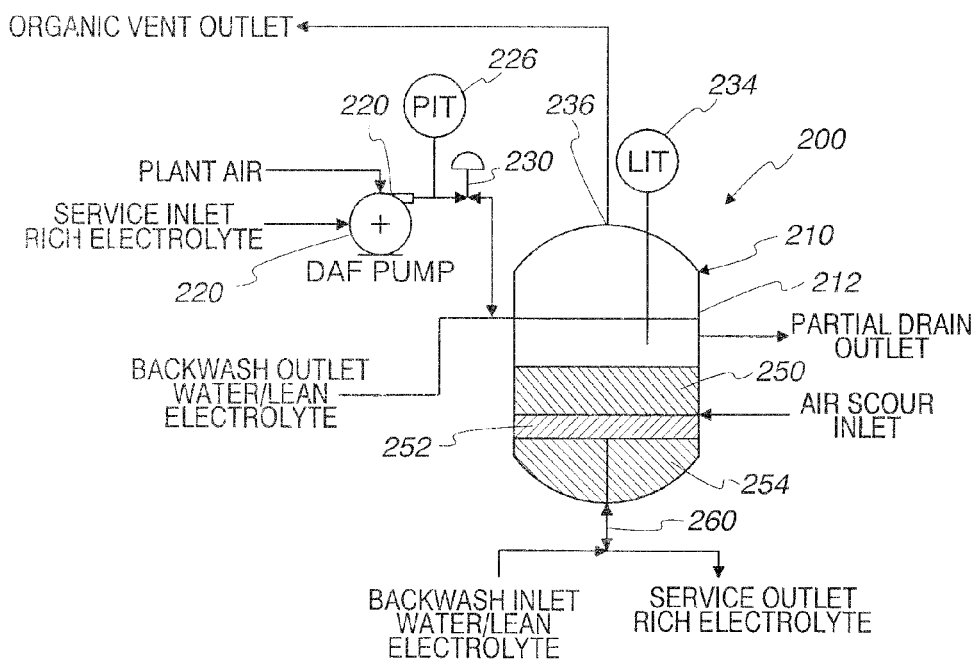

DISSOLVED AIR FLOATATION WITH FILTER SYSTEM

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to filter systems, and more particularly to systems for filtering organic materials out of an electrolyte solution using both floatation and coalescing processes.

BACKGROUND OF THE INVENTION AND TECHNICAL PROBLEMS POSED BY THE PRIOR ART

Solvent extraction (SX)/electrolyte filter systems are used to remove organic molecules from an electrolyte solution. Such systems are used, for example, in the copper mining industry.

Air floatation columns have been used with SX/electrolyte filter systems. In such uses, dissolved air is first introduced into the solution so that it adheres to the organic molecules in the system, which molecules are thereby raised as the air floats to the top of a floatation column. After the air flotation process, the solution is passed on to the filter system for further removal of organic molecules remaining in the solution.

FIG. 1 illustrates a prior art coalesce operational process with an SX filter 10 and floatation column 12. The floatation column 12 operates in front of the filter 10 and introduces air bubbles into the electrolyte solution which is fed at 16 into the floatation column 12. The air bubbles are created by regulating plant air into the column 12. The introduced air bubbles adhere to some of the organic molecules which are, as a result, caused to float to the top of the system, allowing their removal from the floatation column at 18. Such columns typically have 45 to 60 percent organic material removal efficiency.

The electrolyte solution from which some of the organic molecules have been removed is then output at 20 from the floatation column 12 and passed on to the SX filter 10 for further organic material removal such as is known an illustrated in FIG. 1 (i.e., by passing the solution through coalescing media 24 at the bottom of the filter 10 by outputting the solution out the outlet 26 at the bottom).

It should be appreciated that if the floatation column 12 provides a 60 percent removal efficiency and the SX filter 10 provides a 90 percent efficiency, the combined floatation column 12 and SX filter 10 would have about a 96 percent removal efficiency. For example, if 100 PPM of organic molecules enters the feed 16, then the filtered solution exiting the SX filter 10 would have about 4 PPM organic molecules. However, at increased feed flow rates, the combined floatation column 12 and SX filter 10 is not effective at removing organic molecules. As a result, copper manufacturers who use this system have been able to produce middle and high end copper quality at design flow rates, but at high flow rates the copper quality would diminish rapidly, and shutdowns would occur.

Moreover, the equipment used in this dual separation process of the combined floatation column 12 and SX filter 10 is not only costly, but also costly to operate and maintain in order to allow for operation at design conditions on a yearly basis.

The present invention is directed toward overcoming one or more of the problems set forth above.

SUMMARY OF THE INVENTION

In one aspect of the present invention, a system for filtering organic molecules from an electrolyte solution is provided, including a feed inlet line adapted to carry a solution with organic molecules, a filter vessel secured to the inlet line, and a pump adapted to introduce dissolved air into the solution in the feed inlet line. The filter vessel includes coalescing media above a solution outlet at the bottom of the vessel and an organic vent outlet at the top of the vessel.

In one form of this aspect of the present invention, the filter vessel and coalescing media comprise a solvent extraction/electrolyte filter.

In another form of this aspect of the present invention, the system is configured so that the downward flow rate of the solution through the coalescing media is substantially equal to the upward flow rate of floating bubbles in the solution in the filter vessel.

In still another form of this aspect of the present invention, the pump is adapted to introduce dissolved air at a pressure substantially greater than the internal pressure of the filter vessel.

In yet another form of this aspect of the present invention, a recycle loop is in the feed inlet line, and the pump is in the recycle loop.

In a further form of this aspect of the present invention, an adjustable pressure reducing valve is in the inlet line between the pump and the filter vessel.

In another aspect of the present invention, a method of filtering organic molecules from an electrolyte solution is provided, including the steps of (a) dissolving air into a solution with organic molecules, (b) inputting the solution with dissolved air into a filter vessel having coalescing media above a solution outlet at the bottom of the vessel and an organic vent outlet at the top of the vessel, (c) outletting solution from the solution outlet to flow solution down through the coalescing media, and (d) periodically venting floating organic molecules from the top of the vessel.

In one form of this aspect of the present invention, the dissolving step comprises dissolving air at a pressure greater than the pressure in the filter vessel. In a further form, the dissolving air step and the outletting step are controlled to generate a solution flow rate down through the coalescing media which is substantially equal to the upward floatation rate of dissolved air in the filter vessel.

In another form of this aspect of the present invention, the dissolving step is accomplished by a dissolved air floatation pump.

In still another form of this aspect of the present invention, solvent extraction is performed on solution which passes through the coalescing media.

In yet another form of this aspect of the present invention, the inputting step recycles at least some of the solution through the pump in response to a high pressure condition in the filter vessel.

In a further form of this aspect of the present invention, the pressure of the input solution is adjusted in response to the pressure of the solution prior to the inputting step.

BRIEF DESCRIPTION OF THE DRAWINGS

FIG. 2 is a first embodiment of a filter system using dissolved air floatation according to the present invention; and FIG. 3 is a second embodiment of a filter system using dissolved air floatation according to the present invention.

DETAILED DESCRIPTION OF THE INVENTION

Figure 1:
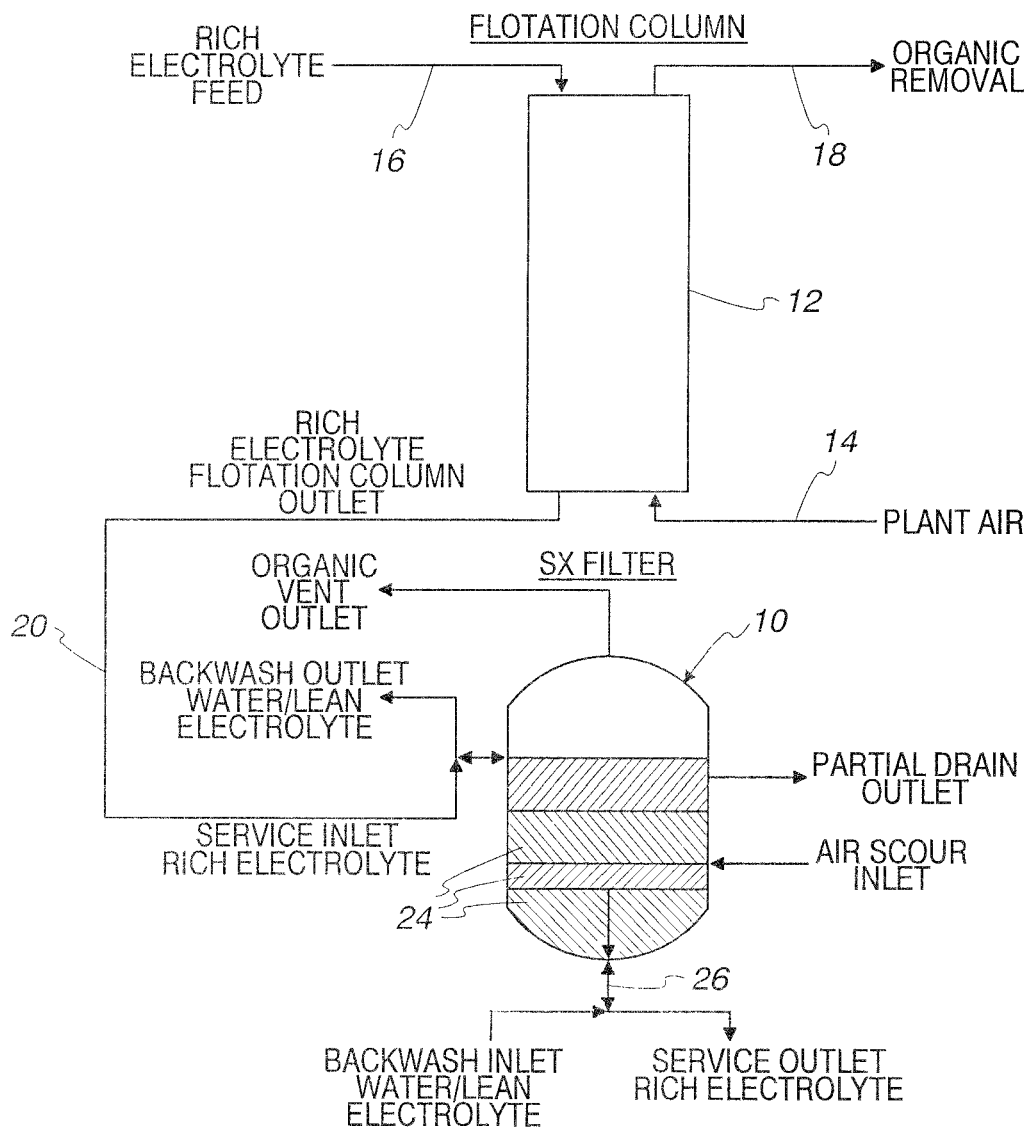
FIG. 1 is a flow diagram illustrating a prior art flotation column and SX filter system.

Two embodiments of a solvent extraction (SX)/electrolyte filter system incorporating the dissolved air flotation (DAF) system of the present invention are illustrated in FIGS. 2 and 3. In accordance with the present invention, the filter systems 100, 200 use small air bubbles in conjunction with coalescing media to remove organic solution from the electrolyte solution within a pressurized SX filter vessel.

Specifically, in the FIG. 2 filter system 100, only a SX filter 110 in a pressure vessel 112 is required. No floatation column is used. Instead, a dissolved air floatation pump 120 is used to induce dissolved air into the electrolyte solution at a high pressure (e.g. 100 psig). Specifically, in the FIG. 2 embodiment, the pump 120 is provided in a recycle loop 124 and receives the rich electrolyte solution at the inlet of the pump 120. A pressure indicating transmitter (PIT) 126 may be advantageously provided to monitor the pressure of the solution (with dissolved air) output from the pump 120. A pressure reducing valve 130 is also provided to enable the pressure of the solution sent to the pressure vessel 112 to be controlled.

If the pressure in the vessel 112 is too high, rather than entering the vessel 112, some of the solution output from the pump 120 will instead pass back through the recycle loop 124. This may be particularly advantageous if the system 100 does not maintain consistent pressure in the vessel 112.

Once the solution with the dissolved air is introduced into the pressure vessel of the SX filter 110, the dissolved air expands at the lower pressure inside the pressure vessel (e.g., 50 psig) and adheres to the organic molecules, raising the molecules as the air floats to the top of the vessel 112. As described in greater detail hereafter, the bubbles from the expanded dissolved air is particularly helpful in maximizing the removal efficiency of the organic molecules.

As the system 100 operates over time, the floated organic molecules will accumulate at the top of the vessel 112, and once sufficiently full (as indicated by the level indication transmitter 134), the organic vent outlet 136 at the top of the vessel 112 is opened to periodically essentially "burp" the floating organic molecules at the top of the solution out of the vessel.

At the same time as organic molecules are being floated to the top of the solution in the vessel 112, the solution flows downwardly through the SX filter 110 such as is known so as to pass down through the coalescing media at the bottom of the vessel 112. In the illustrated filter 110, the coalescing media at the bottom of the filter 110 includes a top layer 150 of anthracite, a middle layer 152 of garnet, and a bottom layer 154 of sand. As is known, the coalescing media will further filter organic molecules from the solution, with the electrolyte solution with most of the organic molecules removed being output out the outlet 160 at the bottom of the vessel 112. In fact, it should be appreciated that the bottom portion of the SX filter 110 may be substantially the same as prior art SX filters, with the changes in accordance with the present invention taking place as a result of intentional floatation occurring at the top of its vessel 112

It should also be appreciated that best operation of this system 100 will result in a downward flow of the solution through the coalescing media which substantially matches the upflow of the floating bubbles. In this manner, the flow of the bubbles will not hinder the flow of the solution down through the coalescing media, nor will the downflow of the solution drag down the bubbles and prevent them from efficiently floating the organic molecules as desired.

The SX filter 110 may thus otherwise operate as is known in the art (and also illustrated in FIG. 1) to further filter the organic molecules from the electrolyte solution using the coalescing media at its bottom. However, the electrolyte solution may, as a result of floatation of the organic molecules in the top of the vessel 112, have 85 percent of the organic molecules removed prior to filtering through the coalescing media. In that case, it should be appreciated that if the SX filter 10 provides a 90 percent efficiency such as in the prior art, the filter system 100 of FIG. 2 would have about a 98.5 percent removal efficiency. For example, if 100 PPM of organic molecules enters the feed 16, then the filtered solution exiting the SX filter 10 would have only about 1.5 PPM organic molecules.

As a result, the filter system 100 may produce at higher rates, and with less down time for filter cleaning operations. In the copper mining industry, for example, copper may be produced at a higher grade and at an increased production rate than with comparable prior art SX filters used in combination with a floatation tower. Moreover, less capital costs will be incurred in the design of new plants and/or expansion of existing facilities. Still further, it should be recognized that existing SX/electrolyte filter systems can be easily modified to incorporate the present invention.

FIG. 3 illustrates a filter system 200 of an alternative embodiment, wherein comparable components to those of the FIG. 2 embodiment are given the same number with the first number changed from "1" to "2" (e.g., the SX filter is 210 rather than 110, the vessel is 212 rather than 112, etc.).

In the FIG. 3 system 200, a pump 220 is similarly used to induce dissolved air into the electrolyte solution at a high pressure, but without a recycling loop. In this system 200, the outlet of the pump 220 goes directly into the vessel 212, and may be particularly suitable for systems 200 which do not have significant fluctuations or inconsistencies within the vessel 212 during operation.

It should thus be appreciated that by introducing saturated dissolved air to the electrolyte solution as described above and then causing the pressure of the environment in which the solution is passed to be reduced relative to the pressure of the dissolved air, air bubbles will be created which will adhere to the organic molecules and float those molecules to the surface for removal. Moreover, as compared with the bubbles of the prior art floatation columns, the bubbles will be smaller and therefore effectively have more surface area per unit of bubble volume, which increased surface area will cause more organic molecules to adhere to the bubbles and float to the top. As a result, the removal efficiency provided through floatation can be significantly increased over that provided by prior art floatation columns. In the end, a copper plant, for example, will be able to produce a higher-grade product, which product can be sold for a higher per unit price.

Further, it should be appreciated that by reducing the amount of organic molecules in the solution which travel through the coalescing media of the filter (relative to the amount in the solution after removal in a floatation column), the filter will become plugged less frequently and therefore need not be shut down for cleaning as frequently as in the prior art.

Still further, it should be appreciated that removal of organic molecules according to the present invention may be accomplished using equipment which requires less capitol costs than the prior art combination of floatation column and SX filter. Similarly, such equipment will require fewer resources for its design, manufacture, installation, and operational maintenance.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A method of filtering organic molecules from an electrolyte solution, comprising:
    dissolving air into a solution with organic molecules;
    inputting the solution with dissolved air into a filter pressure vessel having coalescing media above a solution outlet at the bottom of the vessel and an organic vent outlet at the top of the vessel, said solution input above the coalescing media;
    outletting solution from the solution outlet to flow solution down through the coalescing media; and
    periodically venting floating organic molecules from the top of the vessel.

2. The method of claim 1, wherein said dissolving step comprises dissolving air at a pressure greater than the pressure in the filter vessel.

3. The method of claim 2, wherein said dissolving air step and said outletting step are controlled to generate a solution flow rate down through the coalescing media which is substantially equal to the upward floatation rate of dissolved air in the filter vessel.

4. The method of claim 1, wherein said dissolving step is accomplished by a dissolved air floatation pump.

5. The method of claim 1, wherein solvent extraction is performed on solution which passes through said coalescing media.

6. The method of claim 1, wherein said inputting step recycles at least some of said solution through said pump in response to a high pressure condition in said filter vessel.

7. The method of claim 1, further comprising adjusting the pressure of the input solution in response to the pressure of the solution prior to said inputting step.

* * * * *